April 29, 1969     R. C. THURBER     3,441,140

DRAIN FILTER

Filed Oct. 29, 1965

Inventor
Reginald C. Thurber
By Cushman, Darby & Cushman
Attorneys

3,441,140
DRAIN FILTER

Reginald C. Thurber, Victoria, British Columbia, Canada, Margaret Eleanor Thurber, executrix of said Reginald C. Thurber, deceased, assignor to West Coast Foundation Drilling Co. Ltd., Victoria, British Columbia, Canada, a corporation of Canada
Filed Oct. 29, 1965, Ser. No. 505,647
Claims priority, application Canada, Sept. 2, 1965, 939,732
Int. Cl. E02b *11/00;* B01d *23/10*
U.S. Cl. 210—170          2 Claims

ABSTRACT OF THE DISCLOSURE

A ground water drain comprises an elongated envelope of liquid permeable material, a perforated flexible tube extending the length of said envelope and protruding through the ends thereof, one end of said tube extending to a discharge outlet, said envelope being compartmented by joining the opposite walls thereof to each other at intervals by heat welding.

---

Figure 1:
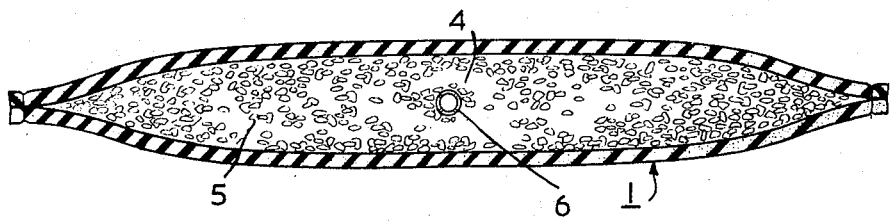

This invention relates to a subsurface drain and in particular, to a device for the relief of pore pressures built up in the vicinity of foundations and embankments, particularly during construction, whereby unwanted free water is carried away.

In civil construction work, such as earthwork projects including highways, railways, dams, drainage works and other building projects, and because of the presence of excessive amounts of water in or adjacent to foundations being constructed, or in embankments or the like in the vicinity of such construction, it is frequently necessary to provide means for carrying away unwanted water from the site to prevent the build up of pore pressures in the subsurface and saturation of critical areas adjacent said foundations. This is due to instability or other problems arising from concentrations of unwanted water saturating the soil on or adjacent to the site and thereby weakening it. Moreover, in many cases, such unwanted water builds up the pore pressure thereby causing hydraulic action which creates instability of the structure.

One attempt at solving this problem has been to place pervious sand and gravel in critical areas adjacent the foundations to act as a filter to prevent such saturation. Such a procedure has frequently involved the additional use of perforated metal pipes of 8", 10" or 12" diameter to lead away any free or unwanted water. Moreover, since such perforated metal pipes have been susceptible to clogging, it has also been necessary to employ gravel or other granular material substantially free from small particles and for this reason, such material has had to be carefully selected and in consequence thereof, has often proved expensive.

In addition to the actual supply pipe and gravel, an additional cost factor has been that the pipe has required such filling may comprise other alternative and suitable pipe layout around the area to be drained and such practice has also been time-consuming.

Furthermore since such perforated metal pipes have also been heavy, the placement thereof has been difficult in areas where suitable manipulative machinery could not easily operate. Moreover, due to the rigidity of the pipe, a specially prepared bed has also had to be provided requiring the use of suitable machines or hand labour. As will be appreciated, such techniques have severe limitations especially in areas where suitable supplies of clean gravel, coarse and fine sand, or other granular material in various sizes are not easily available or owing to the cost factor.

The object of the present invention therefore is to provide a subsurface filtered drainage device overcoming the above disadvantages and which is capable of being supplied in units of considerable length and of relatively high flexibility, at a comparatively low cost.

Accordingly, the present invention relates to a drain filter comprising a collector pipe, leading to discharge outlet, provided with a plurality of perforations disposed along a selected length thereof; an envelope of a liquid permeable material disposed about said selected length of pipe; and, a loosely packed filling material, disposed within said envelope and about said selected length of pipe, permitting liquid to pass from within said envelope, into said pipe, and then discharge.

Figure 2:
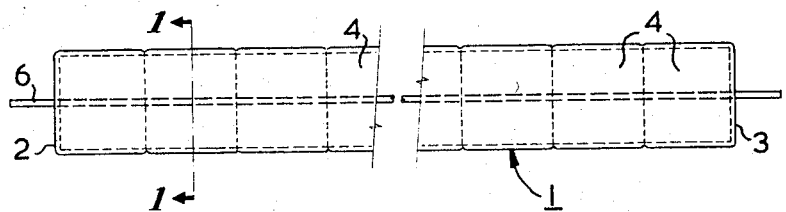
Figure 3:
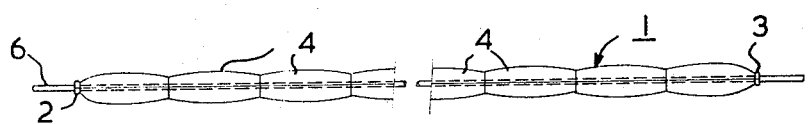

The invention is illustrated, by way of example, in the accompanying drawings, in which:

FIGURE 1 is a transverse, cross-section of the drain taken on the line I—I of FIGURE 2;
FIGURE 2 is a plan view of a length of the drain; and,
FIGURE 3 is a side elevation of FIGURE 2.

Referring to the drawings, the device comprises a liquid permeable envelope, indicated generally at 1, which is formed from an open communicating cellular material such as plastic or rubber sheeting. Such sheeting may be formed from a selected one of the group consisting of epoxy, urethane, polyethylene, polypropylene, synthetic rubbers, GR-S and butyl. It is also contemplated providing envelopes, formed from such sheeting, with a suitable woven textile cover to minimize the tearing of the envelope during installation. Alternatively, the envelope may be formed of wool, cotton, cloth or other similar fibrous material.

The envelope 1 is closed at opposite ends 2, 3 and is formed into a number of compartments 4, by stapling, sewing, heat welding or other similar means appropriate to the material employed for the envelope. Each of the compartments 4 is filled with a loosely packed coarse granular light-weight material 5, such as pearlite insulation, vermiculite, or light-weight concrete aggregate, and such filling may comprise other alternative and suitable materials which are light-weight, not susceptible to undue compacting, swelling or matting in the presence of water or liable to suffer loss of porosity. It is desirable, however, that the filling material 5 is selected according to the environment to be drained.

A flexible collector pipe 6, extends substantially along the central longitudinal axis of the envelope, and is provided, along a predetermined portion of its length, with a plurality of drain holes (not shown), said portion being located within the envelope 1, and the ends 2, 3 forming closures about said pipe.

The pipe 6 may be formed from any of the commercially available substantially semirigid rubber, synthetic rubber or plastic types although nonrigid or metallic pipes may be used in specific applications.

It should be noted that the compartments 4 may be eliminated where the granular material surrounding the pipe comprises larger pieces not susceptible to movement with the envelope 1, since the compartments 4 serve to prevent the granular material from acquiring unequal distribution along the length of the envelope, as a whole when the particles of the granular material are relatively small.

Drainage may be under the influence of gravity or, if desired, the pipes 6 may be connected to any suitable pumping machinery. A typical unit length of the drain filter may be 27" in width, averaging 3" in thickness and 25'-0" in length. A package roll of such size weighs 35–40 lbs.

From extensive field trails, it is felt that the present invention possesses several advantages over hitherto known types of drainage devices. For instance, it has a comparatively low initial cost and low transportation and delivery costs. It is very light-weight and is easy to handle for placement in difficult areas and sites. It is also sufficiently flexible to enable bed preparation to be kept at minimal and avoids the use of separate filter gravel or filter sand. Furthermore, the drain filter will filter out fine grained soils and draw water from saturated soil conditions, besides operating under heavy pressures of soil load and embankment fills. Moreover, all of the components of the novel drain filter are substantially permanent and non-corrosive and will not deteriorate with time. Additionally, the drain filter may be rolled up, complete with its pipe, giving it the advantage of relatively easy stockroom storage.

It must be recognized that this subsurface drainage device has been invented and designed for specific purposes of drainage common to the practice of earthwork in civil engineering practice, including highway construction, dam construction, railway construction, foundations for buildings and bridges, levies, earthfills and various other types of work, involving soils and where an outlet for water is required below the surface of the ground level.

I claim:

1. A ground water drain device comprising an elongated flat and flexible envelope of liquid permeable material, a perforated flexible tube extending the length of said envelope and protruding through the ends thereof, means securing the ends of said envelope to the tube, one end of said tube extending to a discharge outlet, said envelope being compartmented by joining the opposite walls thereof to each other along substantially their entire width at intervals, and the compartments being loosely filled with granules of water-insoluble material of a size larger than the perforation in said tube, whereby said device may be bent and rolled up, for ease of storage, transportation and the like.

2. A ground water drain as defined in claim 1, wherein said envelope material is heat softenable synthetic plastic material, and is compartmented by joining opposite walls thereof to each other at intervals by heat welding.

References Cited

UNITED STATES PATENTS

| | | | |
|---|---|---|---|
| 2,063,086 | 12/1936 | FitzGerald | 210—282 |
| 2,435,510 | 2/1948 | Rabjohn | 210—284 X |
| 2,796,939 | 6/1957 | Woodruff | 210—284 X |
| 3,133,595 | 5/1964 | Loughney et al. | 210—282 X |
| 3,266,628 | 8/1966 | Price | 210—266 X |

SAMIH N. ZAHARMA, *Primary Examiner.*

U.S. Cl. X.R.
210—282, 284, 461